(12) United States Patent
Hyung et al.

(10) Patent No.: US 7,993,770 B2
(45) Date of Patent: Aug. 9, 2011

(54) CYLINDRICAL LITHIUM ION SECONDARY BATTERY

(75) Inventors: Yooeup Hyung, Yongin-si (KR);
Jungseok Kim, Yongin-si (KR);
Yongtae Kim, Yongin-si (KR);
Sangbong Nam, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 1196 days.

(21) Appl. No.: 11/643,814

(22) Filed: Dec. 22, 2006

(65) Prior Publication Data

US 2007/0154797 A1     Jul. 5, 2007

(30) Foreign Application Priority Data

Dec. 29, 2005  (KR) .................. 10-2005-0134534

(51) Int. Cl.
  *H01M 2/22*     (2006.01)
  *H01M 2/26*     (2006.01)
  *H01M 4/64*     (2006.01)
(52) U.S. Cl. ................... 429/94; 429/211; 429/233
(58) Field of Classification Search .............. None
See application file for complete search history.

(56) References Cited

U.S. PATENT DOCUMENTS 5,354,629 A * 10/1994 Kuroda et al. ................ 429/94
5,989,743 A * 11/1999 Yamashita .................... 429/129
2003/0186095 A1 10/2003 Okutani et al.

FOREIGN PATENT DOCUMENTS

| JP | 2002-270148 | | 9/2002 |
| JP | 2003-229177 | A | 8/2003 |
| JP | 2005-149961 | | 6/2005 |
| JP | 2006-004792 | A | 1/2006 |
| KR | 1020030078019 | | 10/2003 |
| KR | 1020050010611 | A | 1/2005 |
| KR | 10-646500 | B | * 11/2006 |

OTHER PUBLICATIONS

Machine translation of KR 10-646500B, Nov. 2006.*

* cited by examiner

*Primary Examiner* — Jonathan Crepeau
(74) *Attorney, Agent, or Firm* — Robert E. Bushnell, Esq.

(57) ABSTRACT

In a cylindrical lithium ion secondary battery, the width of an electrode tab positioned at a center of an electrode assembly is extended so that it serves as a center pin and functions to release heat. Thus, it is not necessary to separately insert a center pin, thereby reducing the manufacturing cost and steps. The cylindrical lithium ion secondary battery comprises an electrode assembly, a case for receiving the electrode assembly, and a cap assembly for sealing the top opening of the case. The electrode assembly comprises a positive electrode plate and negative electrode plate. The positive electrode plate has a positive electrode tab, a positive active material region, a positive uncoated region, and a positive current collector exposed through the positive uncoated region. The negative electrode plate has a negative electrode tab, a negative active material region, a negative uncoated region, a negative current collector exposed through the negative uncoated region, and a separator interposed between the positive and negative electrode plates. At least one of the positive and negative electrode tabs has an extended width at the center of the electrode assembly.

20 Claims, 6 Drawing Sheets

CYLINDRICAL LITHIUM ION SECONDARY BATTERY

CLAIM OF PRIORITY

This application makes reference to, incorporates the same herein, and claims all benefits accruing under 35 U.S.C. §119 from an application earlier filed in the Korean Intellectual Property Office on Dec. 29, 2005 and there duly assigned Serial No. 10-2005-0134534.

BACKGROUND OF THE INVENTION

1. Technical Field

The present invention relates to a cylindrical lithium ion secondary battery, and more particularly, to a cylindrical lithium ion secondary battery comprising electrode tabs welded to uncoated regions of electrode plates, wherein among the above-mentioned electrode tabs, the width of an electrode tab which is positioned at the center of a jelly-roll type structure of an electrode assembly is extended so that the electrode tab also serves as a center pin and has a heat release function, whereby the manufacturing steps and costs for the secondary battery can be reduced because it is not necessary to insert a separate center pin.

2. Description of the Prior Art

In general, a cylindrical lithium ion secondary battery comprises a cylindrical electrode assembly to which a center pin is fitted, electrolyte contained in the electrode assembly, a cylindrical case for receiving the electrode assembly and the electrolyte, and a cap assembly assembled to the top opening of the cylindrical case for sealing the cylindrical case.

Since such cylindrical lithium ion secondary batteries have a capacity of about 2,000 to 2,400 mAh, they are usually used in notebook computers, digital cameras, camcorders or the like, which requires a large capacity of power. Those secondary batteries are assembled and used in a desired form of a battery pack, in which the batteries are connected in series and/or in parallel according to the required level of voltage or power, and a safety device is provided in the battery pack.

In a cylindrical lithium ion secondary battery having a cylindrical center pin which is separately inserted, the center pin is inserted through the center of the electrode assembly so as to prevent the deformation of the electrode assembly, and so as to quickly discharge, to the top side of the battery (i.e., toward the cap assembly), the gas which is produced within the battery due to heat or the like. A space is formed in the central area of the electrode assembly received in the case. Such a space is formed as a result of extracting a shaft which is used when winding the positive electrode plate and the negative electrode plate with a separator interposed between the positive electrode plate and the negative electrode plate. The center pin is formed by rolling up a thin metallic sheet in a cylindrical form in consideration of cost and gas discharge efficiency. However, when the center pin is formed in this manner, a slit having a predetermined width is formed along the opposite ends of the rolled sheet. In order to prevent the formation of such a slit, the center pin may be occasionally formed in a cylindrical single-piece unit from the beginning.

When a center pin is separately fabricated and inserted into the electrode assembly, there is a disadvantage in that the fabrication costs are high, and the insertion step should be performed. In addition, if the battery is impacted due to falling or the like, the center pin may come out of the electrode assembly and strike the safety vent, thereby deforming or fracturing the safety vent.

SUMMARY OF THE INVENTION

Accordingly, the present invention has been developed to improve the above-mentioned conventional secondary batteries, and an object of the present invention is to provide a secondary battery in which the width of an electrode tab is extended so that the electrode tab can also serve as a center pin, whereby it is not necessary to separately fabricate or insert a center pin, as a result of which fabricating cost and steps can be reduced.

In order to achieve the above-mentioned object, there is provided a cylindrical lithium ion secondary battery comprising: an electrode assembly which includes: a positive electrode plate having a positive electrode tab, a positive active material region, a positive uncoated region formed adjacent to the positive active material region, and a positive current collector exposed through the positive uncoated region; a negative electrode plate having a negative electrode tab, a negative active material region, a negative uncoated region formed adjacent to the negative active material region, and a negative current collector exposed through the negative uncoated region; a separator interposed between the positive electrode plate and the negative electrode plate; a case for receiving the electrode assembly; and a cap assembly for sealing the top opening of the case; wherein at least one of the positive electrode tab and the negative electrode tab is formed so as to have an extended width at the center of the electrode assembly.

In the latter regard, the width of at least one of the positive and negative electrode tabs may be extended toward or away from a winding core of the electrode assembly. At least one of the positive and negative electrode tabs may have a projecting portion which is higher than the other portion in the electrode tab, and which is exposed to the top of the electrode assembly, and a center pin portion which is connected to the projecting portion, and which has a width extending toward or away from the winding core of the electrode assembly. The height of the center pin portion may be equal to that of the electrode assembly.

The center pin portion may be wound in a circular arc form in cross-section, and it is preferable that the length of the circular arc be not less than 70% of the circumference of the entire circle including the arc. The center pin portion may be welded over its entire area to the corresponding electrode plate, and the center pin portion welded area may be an uncoated region in the corresponding electrode plate.

In addition, the center pin portion may consist of a first area defined by vertical extension lines of the opposite sides of the projection portion, and a second area which is the remaining area exclusive of the first area in the center pin portion. In the latter regard, the center pin portion may be welded to the corresponding electrode plate only at the first area, and the electrode plate may have an uncoated region formed at an area where the electrode plate comes into contact with the first area, and an electrode active material region formed at an area where the electrode plate comes into contact with the second area.

Furthermore, the center pin portion may have a plurality of holes formed in the second area. The holes may be formed in any shape, such as a circular, triangular or rectangular shape.

The electrode tab may be formed of aluminum (Al) or nickel (Ni).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, preferred embodiments of the present invention will be described with reference to the accompanying drawings so that a person skilled in the art will be capable of easily embodying the present invention.

Figure 1:
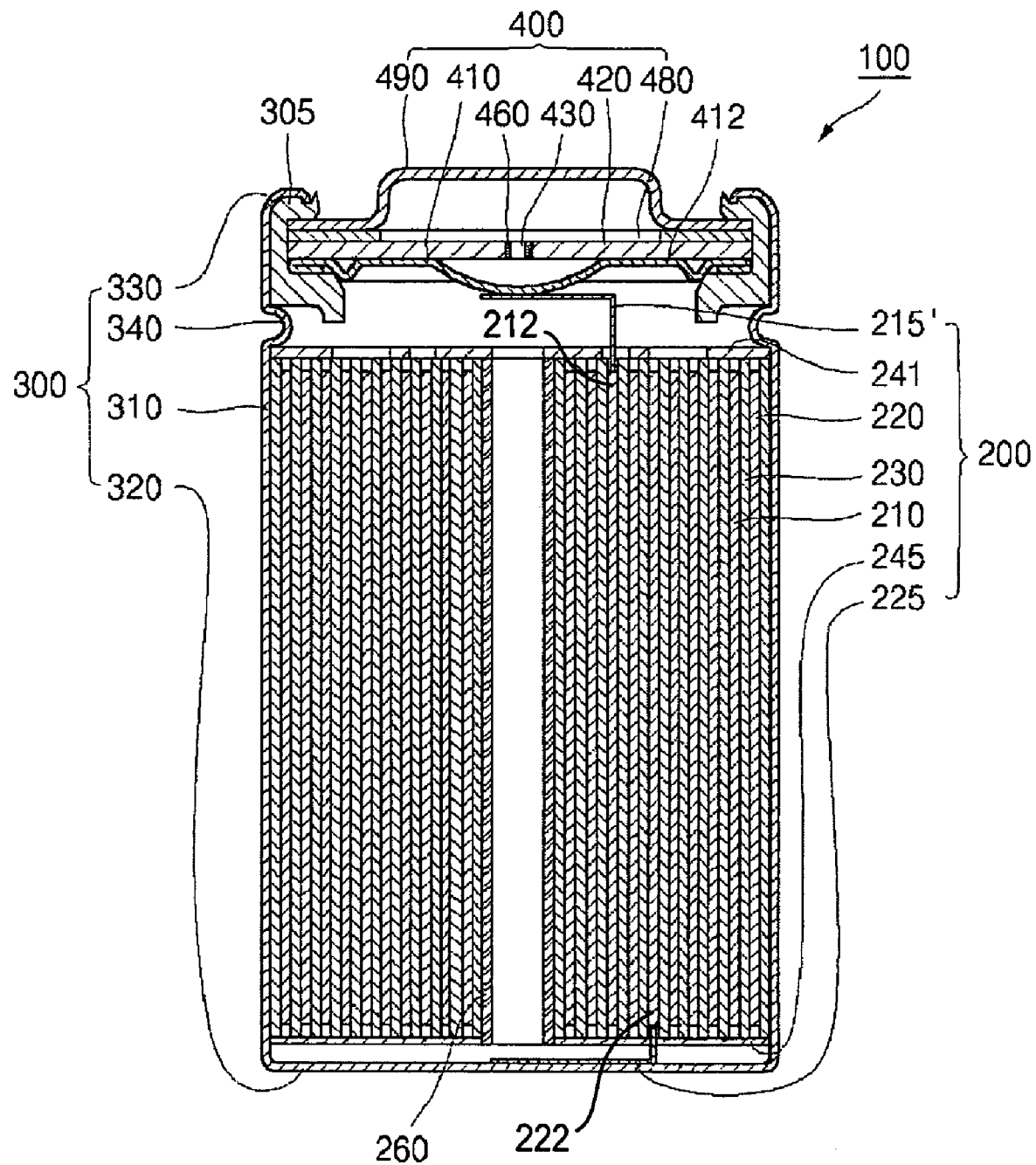
FIG. 1 is a cross-sectional view of a cylindrical lithium ion secondary battery with a cylindrical center pin which is separately inserted.

FIG. 1 is a cross-sectional view of a cylindrical lithium ion secondary battery with a cylindrical center pin which is separately inserted.

Referring to FIG. 1, a cylindrical lithium ion secondary battery 100 includes an electrode assembly 200, a cylindrical case 300 for receiving the electrode assembly 200 and an electrolyte (not shown), and a cap assembly 400 assembled to the top opening of the cylindrical case 300 so as to seal the cylindrical case 300, the cap assembly 400 allowing electric current produced in the electrode assembly 200 to flow to an external apparatus.

The electrode assembly 200 comprises a positive electrode plate 210 with a positive current collector, the surface of which is coated with a positive active material, a negative electrode plate 220 with a negative current collector, the surface of which is coated with a negative active material, and a separator 230 interposed between the positive electrode plate 210 and the negative electrode plate 220 so as to electrically insulate the positive electrode plate 210 and the negative electrode plate 220 from one another, the separator 230 being wound in a jelly-roll type. Although not shown in detail, the positive electrode plate 210 includes a positive current collector which is formed from an aluminum (Al) foil, and positive active material films which are coated on the opposite surfaces of the positive current collector. At opposite ends, the positive electrode plate 210 is provided with positive current collector regions which are not formed with a positive active material film, i.e., positive uncoated regions 212. A positive electrode tab 215' is adhered to one end of the positive uncoated regions 212 and protrudes by a predetermined length above the top end of the electrode assembly 200, the positive electrode tab 215' being formed from an aluminum material. In addition, the negative electrode plate 220 comprises a negative current collector which is formed from a conductive metal sheet, for example, a copper (Cu) or nickel (Ni) foil, and negative active material films which are coated on the opposite surfaces of the negative current collector. At the opposite ends, the negative electrode plate 220 has negative current collector regions which are not formed with a negative active material film, i.e., negative uncoated regions 222. A negative electrode tab 225 is adhered to one end of the negative uncoated regions 222, and protrudes by a predetermined length below the bottom end of the electrode assembly 200, the negative electrode tab 225 being typically formed from a nickel material. In addition, insulation plates 241 and 245 may be further provided on the top and bottom sides, respectively, of the electrode assembly 200 so as to prevent the electrode assembly 200 from contacting the cap assembly 400 or the cylindrical case 300.

The cylindrical case 300 includes a cylindrical side plate 310 having a predetermined diameter so as to form a space capable of receiving the cylindrical electrode assembly 200, and a bottom plate 320 for sealing the bottom portion of the cylindrical side plate 310, the top portion of the cylindrical side plate 310 being open for allowing the insertion of the electrode assembly 200. As the negative electrode tab 225 of the electrode assembly 200 is adhered to the center of the bottom plate 320 of the cylindrical case 300, the cylindrical case 300 will serve as a negative pole. The cylindrical case 300 is typically formed from aluminum (Al), iron (Fe) or alloys thereof. In addition, a crimped portion 330, which is inwardly bent, is formed on the top end of the cylindrical case 300 so as to compress the top portion of the cap assembly 400 which is fitted in the top opening of the cylindrical case 300. Furthermore, a beaded portion 340, which is inwardly recessed, is also formed at a position spaced below the crimped portion 330 by a distance corresponding to the thickness of the cap assembly 400 so as to compress the bottom part of the cap assembly 400.

The cap assembly 400 comprises a safety vent 410, a current interrupting device 420, a secondary protection element 480, and a cap-up 490. The safety vent 410 is flat and has a projection which projects downward at the center thereof, and the safety vent 410 is positioned under the cap assembly 400, wherein the projection may be deformed upward by the pressure occurring in the secondary battery. At a predetermined position on the bottom side of the safety vent 410, an electrode tab extending from either the positive electrode plate 210 or the negative electrode plate 220 of the electrode assembly 200 (for example, the positive electrode tab 215' extending from the positive electrode plate 210) is welded so as to electrically interconnect the safety vent 410 and the positive electrode plate 210 of the electrode assembly 200. In this respect, the remaining one of the positive electrode plate 210 and the negative electrode plate 220 (for example, the negative electrode plate 220) is electrically connected to the case 300 by a tab which is not shown in the drawing or through a direct contact method.

In addition, a center pin 260 is inserted through the center of the electrode assembly 200 so as to prevent the deformation of the electrode assembly 200, and so as to quickly discharge, to the top side of the battery (i.e., toward the cap assembly 400), the gas which is produced within the battery due to heat or the like. A space is formed in the central area of the electrode assembly 200 received in the case 300. Such a space is formed as a result of extracting a shaft which is used when winding the positive electrode plate 210 and the negative electrode plate 220 with the separator 230 interposed between the positive electrode plate 210 and the negative electrode plate 220. The center pin 260 is formed by rolling up a thin metallic sheet in a cylindrical form in consideration of cost and gas discharge efficiency. However, when the center pin 260 is formed in this manner, a slit having a predetermined width is formed along the opposite ends of the rolled sheet. In order to prevent the formation of such a slit, the center pin 260 may be formed in a cylindrical one-piece unit from the beginning.

Figure 2:
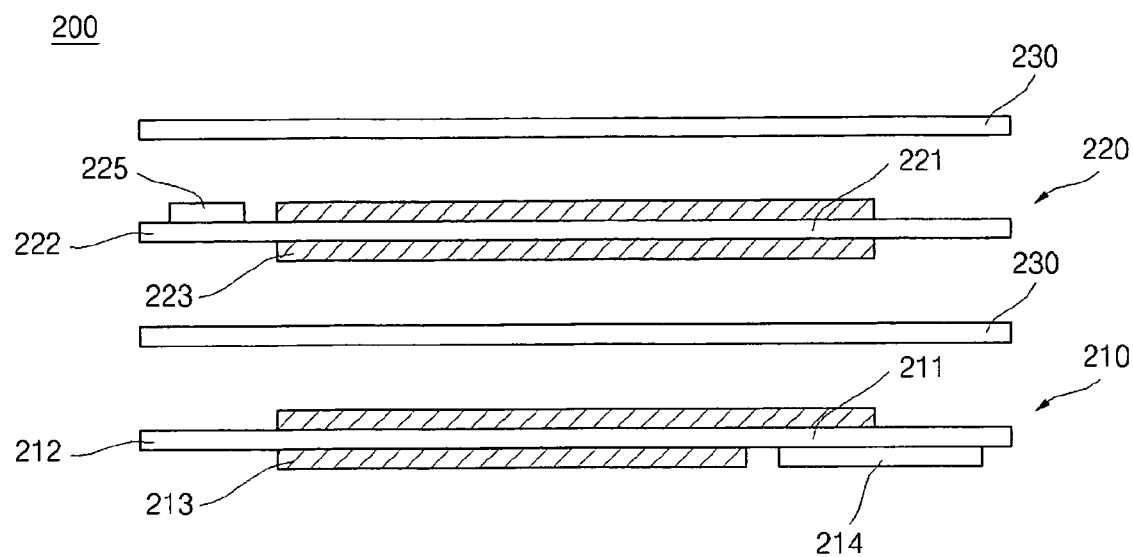
FIG. 2 is a top plan view of an inventive electrode assembly which, according to the present invention, is formed with electrode tabs prior to winding the electrode assembly.
Figure 3:
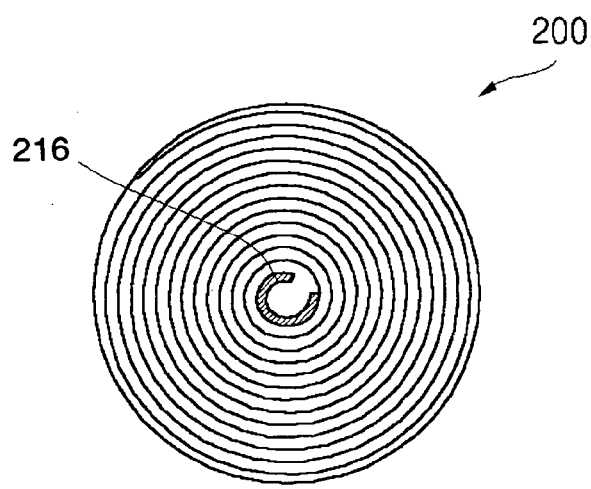
FIG. 3 is a top plan view of the inventive electrode assembly which, according to the present invention, is formed with electrode tabs after winding the electrode assembly.
Figure 4:
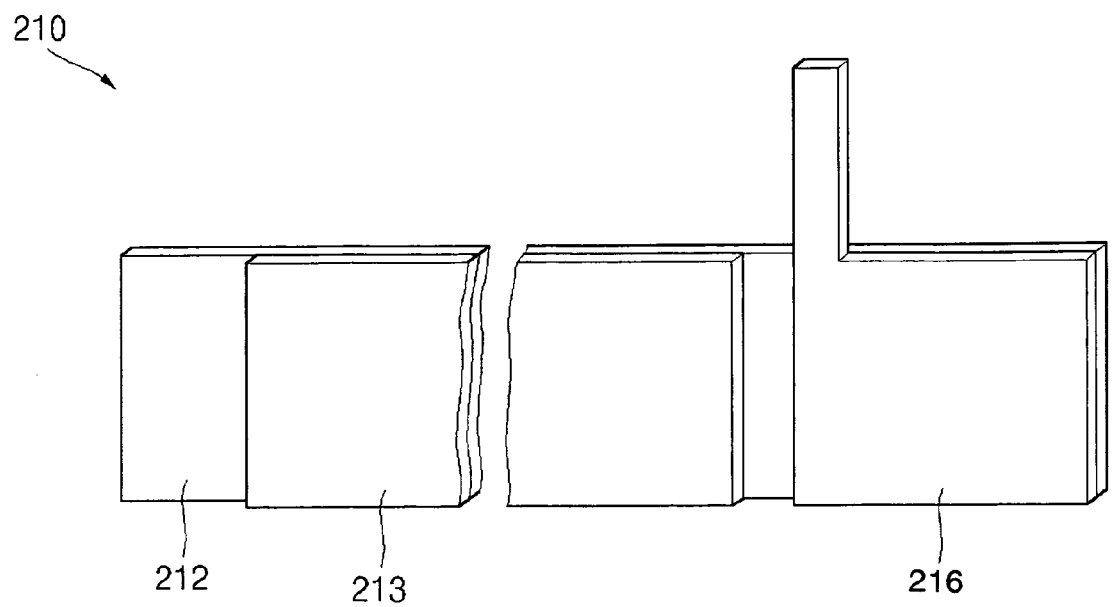
FIG. 4 is a perspective view showing the shape of an electrode having an electrode tab, the width of which extends toward a winding core of an electrode assembly, according to an embodiment of the present invention.
Figure 5:
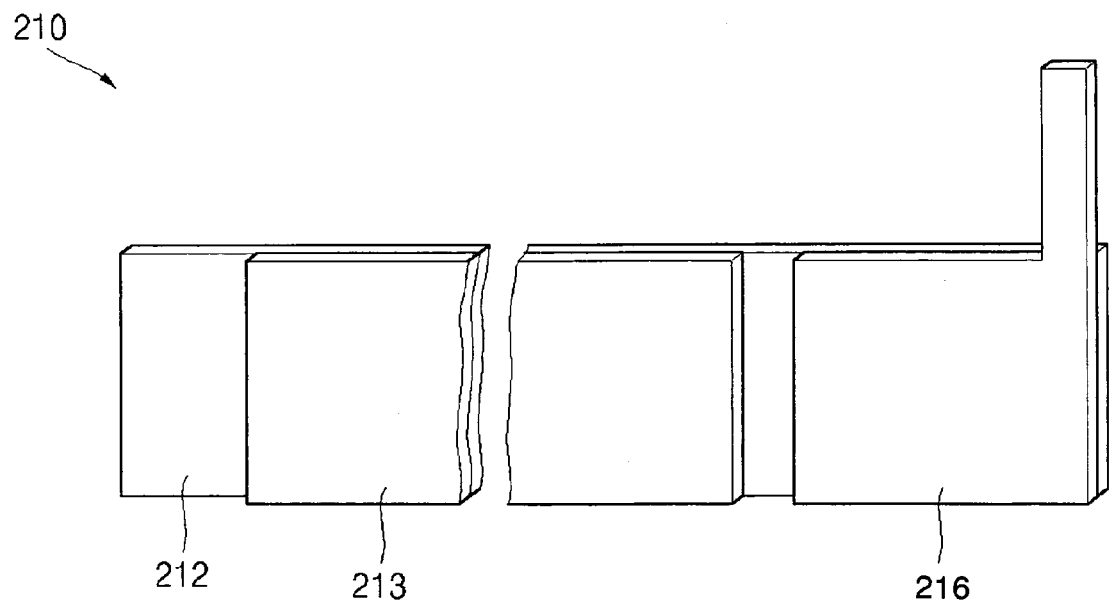
FIG. 5 is a perspective view showing the shape of an electrode having an electrode tab, the width of which extends away from the winding core of an electrode assembly, according to another embodiment of the present invention.
Figure 6:
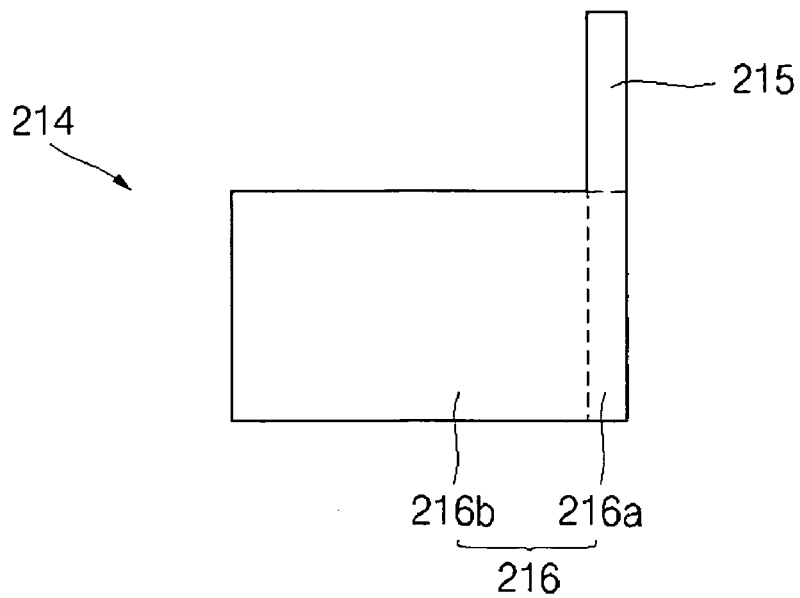
FIG. 6 is a top plan view of an electrode tab according to another embodiment of the present invention.
Figure 7:
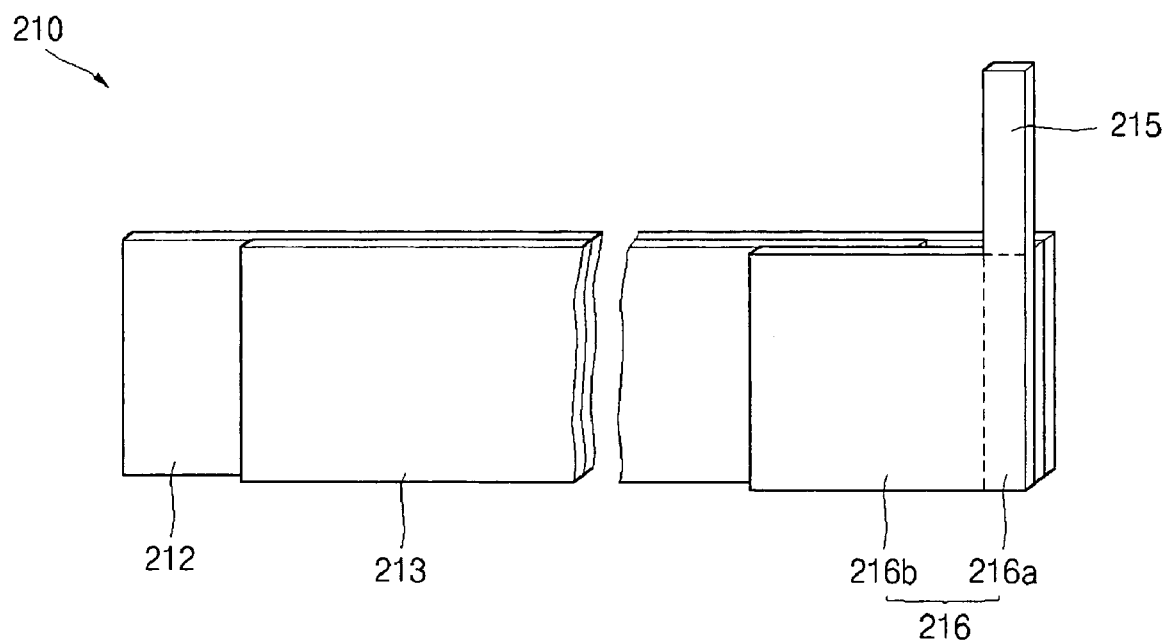
FIG. 7 is a perspective view showing the shape of an electrode plate according to another embodiment of the present invention.
Figure 8A:
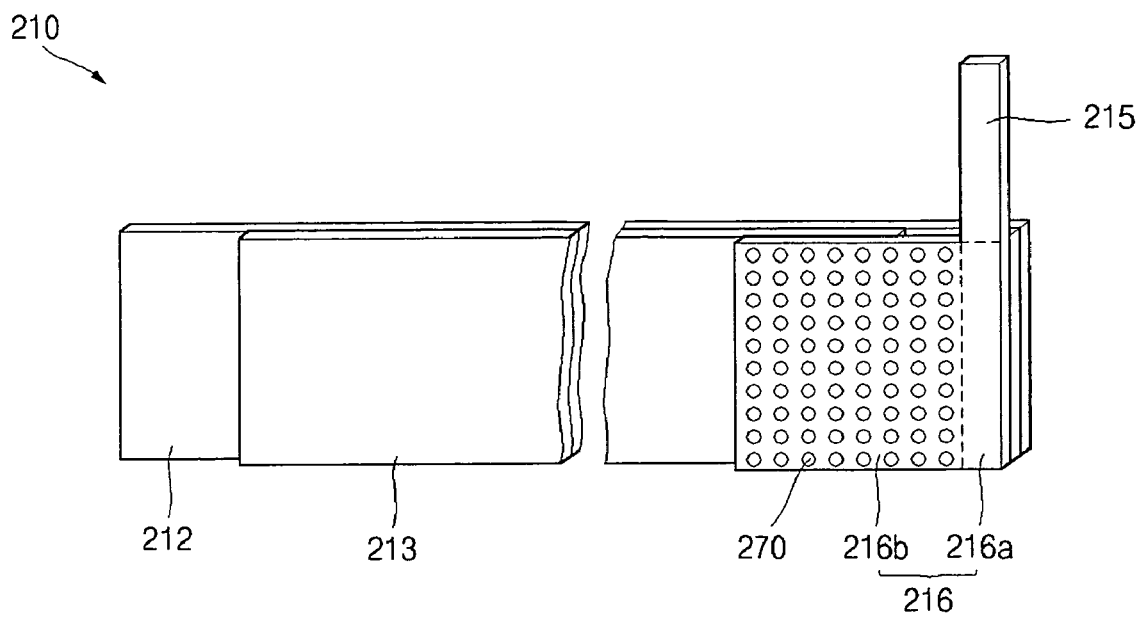
FIGS. 8a, 8b and 8c are perspective views showing the shapes of electrode plates of other embodiments of the present invention.
Figure 8B:
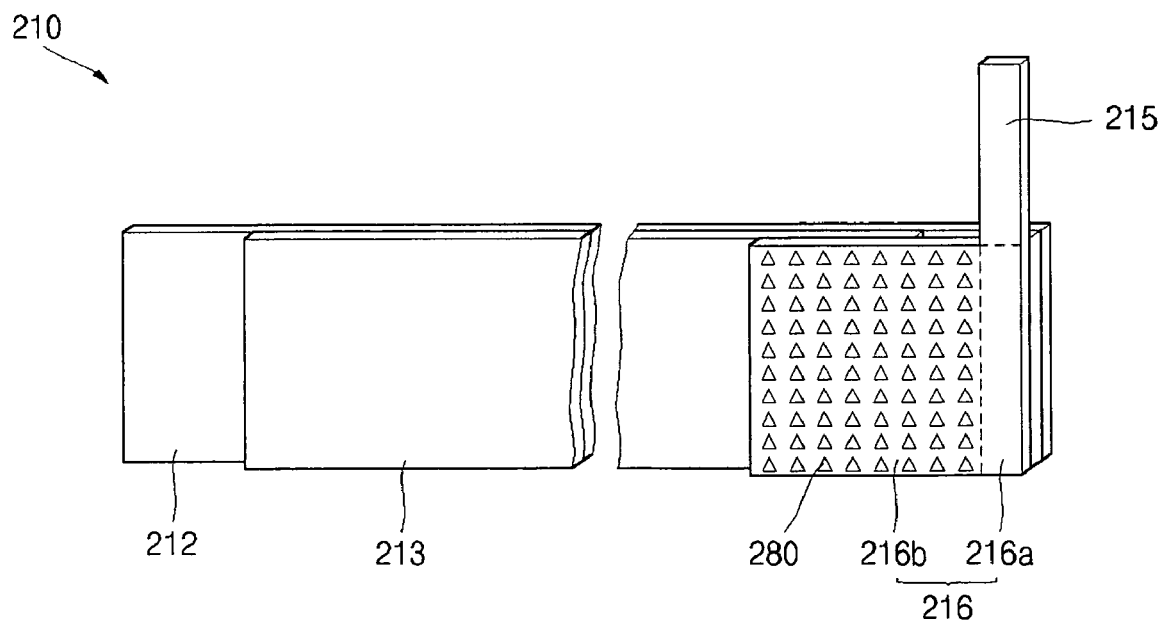
Figure 8C:
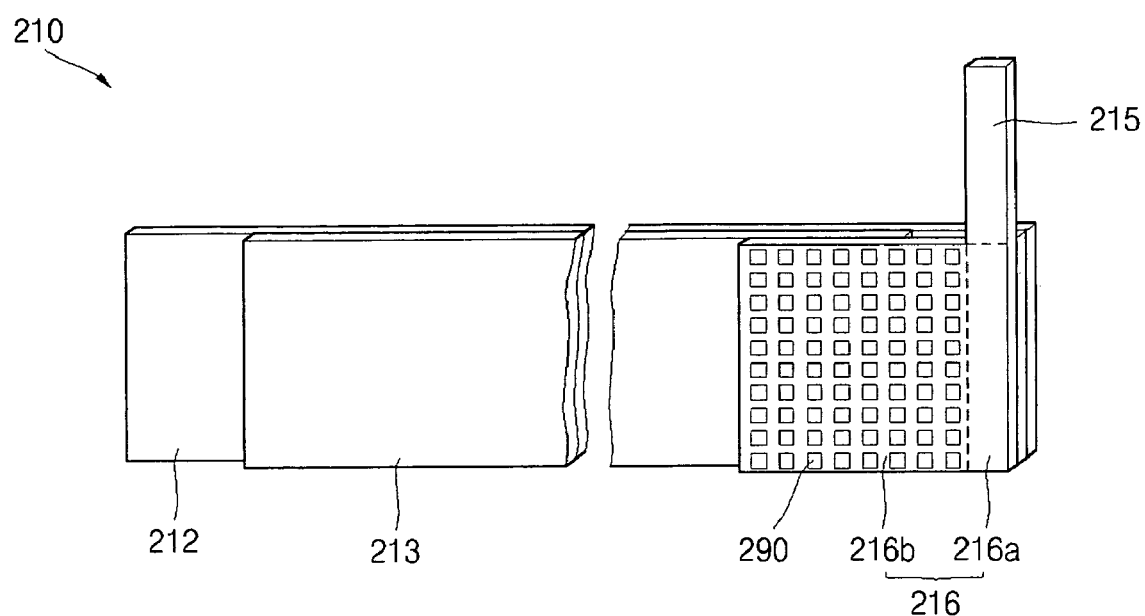

FIG. 2 is a top plan view of an inventive electrode assembly which, according to the present invention, is formed with electrode tabs prior to winding the electrode assembly; FIG. 3 is a top plan view of the inventive electrode assembly which, according to the present invention, is formed with electrode tabs after winding the electrode assembly; FIG. 4 is a perspective view showing the shape of an electrode with an electrode tab, the width of which extends toward a winding core of an electrode assembly, according to an embodiment of the present invention; FIG. 5 is a perspective view showing the shape of an electrode having an electrode tab, the width of which extends away from the winding core of an electrode assembly, according to another embodiment; FIG. 6 is a top plan view of an electrode tab according to another embodiment of the present invention; FIG. 7 is a perspective view showing the shape of an electrode plate according to another embodiment of the present invention; and FIGS. 8a, 8b and 8c are perspective views showing the shapes of electrode plates of other embodiments of the present invention.

Among a positive electrode tab and a negative electrode tab, the inventive electrode tab is related to the electrode tab which is positioned at the central part of the electrode assembly. Herein, a description is made in terms of a positive electrode tab.

Referring to FIG. 2, the inventive electrode assembly 200 may comprise a positive electrode plate 210 and a negative electrode plate 220, which are opposite to each other, and a separator 230 interposed between the positive electrode plate 210 and the negative electrode plate 220.

The negative electrode plate 220 may comprise a negative current collector 221 for collecting and transferring, to an external circuit, electrons produced through a chemical reaction, negative active material region(s) 223 which is (are) coated on one side (or both sides) of the negative current collector 221, and which has (have) a structure capable of adsorbing or desorbing lithium ions, and a negative uncoated region 222 where the negative current collector 221 is exposed since no negative active material is coated. A negative electrode tab 225 for transferring electrons collected in the negative current collector 221 to an external circuit may be welded to the negative uncoated region 222 through supersonic welding. The negative current collector 221 is typically formed of copper (Cu), nickel (Ni) or an equivalent, and the negative electrode tab 225 is typically formed of nickel or an equivalent. In addition, the negative active material region 222 is formed by mixing a conductive material and a binder with a carbon material.

The separator 230 is interposed between the positive electrode plate 210 and the negative electrode plate 220 so as to prevent an electric short which may occur between the positive electrode plate 210 and the negative electrode plate 220. The separator 230 is typically formed of a thermoplastic resin, such as polyethylene (PE), polypropylene (PP) or an equivalent, and the surface of the separator 230 is formed with a porous film structure. When the internal temperature of the battery is increased and approaches the melting point of the thermoplastic resin, the separator 230 melts and holes in the separator are blocked, so that such a porous film structure is turned into an insulation film. Such a phenomenon is referred to as a sealing or shutdown phenomenon of the separator 230. As the porous film is turned into an insulation film, the movement of lithium ions between the positive electrode plate 210 and the negative electrode plate 220 is blocked, and electric current cannot flow any longer, whereby the increase of temperature within the battery is halted.

The positive electrode plate 210 may comprise a positive current collector 211 for transferring current produced through a chemical reaction to an external circuit, positive active material region(s) 213 which is (are) coated on one side (or both sides) of the positive current collector 211, and which has (have) a structure capable of adsorbing or desorbing lithium ions, and a positive uncoated region 212 where the positive current collector 211 is exposed since no positive active material is coated. A positive electrode tab 214 for transferring electrons collected in the positive current collector 211 to an external circuit may be welded to the positive uncoated region 212 through supersonic welding. The positive current collector 211 is typically formed of aluminum (Al) or an equivalent. In addition, the positive active material region 213 is formed by mixing a conductive material and a binder with a metal oxide capable of providing lithium ions.

Referring to FIG. 1, the positive electrode tab 215' is typically formed in an elongated rectangular rod shape having a length capable of being welded to the bottom side of the safety vent 412. Typically, such a positive electrode tab 215' has a thickness of about 100 μm. Referring to FIGS. 4 and 5, the inventive positive electrode tab 214 is formed so as to have an extended width. The positive electrode tab 214 may have a width extending toward the winding core of the electrode assembly 200 (see FIG. 4), or away from the winding core of the electrode assembly 200 (see FIG. 5).

Referring to FIG. 6, the positive electrode tab 214 may comprise a projection portion 215 which is formed higher than the other portion in the positive electrode tab 214 so as to be exposed from the top end of the electrode assembly 200, and a center pin portion 216 which is connected to the projection portion 215 and which has a width extending toward or away from the winding core of the electrode assembly 200.

The projection portion 215 may be formed in an elongated rectangular rod shape having a length capable of being welded to the bottom side of the safety vent 412 (FIG. 1). The projection portion 215 is welded to the bottom side of the safety vent 412 so as to transfer the current of the positive current collector 211 (FIG. 2) to an external circuit through the cap assembly 400 including the safety vent 412. The projection portion 215 may be formed at the left side of the top end of the center pin portion 216, which will be described later, as shown in FIG. 4 or at the right side of the top end of the center pin portion 216 as shown in FIG. 5. Of course, the projection portion 215 may be positioned at the center of the top end although it is not shown in the drawings.

If the projection portion 215 is formed at the left side of the top end of the center pin portion 216, the width of the center pin portion 216 extends toward the winding core of the electrode assembly 200, and if the projection portion 215 is formed at the left side of the top end of the center pin portion 216, the width of the center pin portion 216 extends away from the winding core of the electrode assembly 200.

The center pin portion 216 will serve as a center pin by being wound together with the positive electrode plate 210 when the electrode assembly 200 is wound. Therefore, the height of the center pin portion 216 may be equal to that of the electrode assembly 200. Referring to FIG. 3, the center pin portion 216 may be formed in a circular arc shape in cross-section having a predetermined length when the electrode assembly 200 is wound. In this regard, the width of the center pin portion 216 may be determined depending on the length of the circular arc formed when the electrode assembly 200 is wound. According to experiments, it is desirable that the length of the circular arc formed by winding be not less than 70% of the entire circumference of a circle including the arc. If the length of the circular arc is less than 70% of the entire circumference of the circle, the shape of the center pin portion 216 may be deformed by not sufficiently enduring the deformation of the electrode assembly 200, or the central area of the electrode assembly 200 may be deformed toward the winding core as the center pin portion 216 cannot sufficiently support the central area of the electrode assembly 200.

Referring to FIG. 6, the center pin portion 216 may consist of a first area 216a which is defined by extension lines extending vertically from the opposite sides of the projection portion 215, and a second area 216b which is the remaining area exclusive of the first area 216a in the center pin portion 216. The center pin portion 216 may be welded to the positive uncoated region 212 either at both of the first and second areas 216a and 216b, respectively, as shown in FIGS. 4 and 5 or only at the first area 216a as shown in FIG. 7.

When both of the first and second areas 216a and 216b, respectively, are welded to the positive uncoated region 212, there is an advantage in that the welding area is increased, and thus high welding force can be maintained after winding. However, in that event, the area of the positive active material region 213 is reduced as the area occupied by the center pin portion 216 is increased. However, in the case in which only the first area 216a is welded to the positive uncoated region 212, the positive uncoated region 212 may be formed at an area where the positive electrode plate 210 comes into contact with the first area 216a, and the positive active material region 213 may be formed at an area where the positive electrode plate 210 comes into contact with the second area 216b, as shown in FIG. 7. As a result, although minute, the amount of positive active material can be increased so that the capacity of the battery can be retained at a level similar to that of a conventional battery.

Referring to FIG. 1, a center pin 260 is inserted in a cylindrical lithium ion secondary battery for the following reasons:

a) As the lithium ion secondary battery is repeatedly charged and discharged, the electrode assembly 200 expands. However, since it is blocked by the case 300 on the outside, the electrode assembly 200 can expand toward the central area thereof, thereby deforming the electrode plates, which may result in an electric short. The center pin 260 functions to prevent such deformation of the electrode plates.

b) If the inside of the battery is at a high temperature due to overcharge or the like, a great amount of gas is produced inside the battery. In such a case, the center pin 260 serves as a gas discharge passage. Referring to FIGS. 8a to 8c, a plurality of holes 270, 280 and 290 may be formed in the second area 216b of the center pin portion 216 so as to ensure that the center pin 260 functions as a gas discharge passage. The holes 270, 280 and 290 may be formed in circular, triangular or rectangular shape, but are not limited to these. The holes 270, 280 and 290 formed in the second area 216b of the center pin portion 216 function to smoothly guide the gas produced inside the electrode assembly 200 to the interior of the center pin portion 216. When the internal temperature of a bare cell is highly increased due to overcharge or the like so that gas is produced, the gas produced within the electrode assembly 200 moves through the holes 270, 280 and 290 to the inside of the wound center pin portion 216, and ascends in the center pin portion 216, thereby increasing the internal pressure of the bare cell. Referring to FIG. 1, the internal pressure pushes the safety vent 412 upward, which is one component of the cap assembly 400, as a result of which the current interrupting device (CID) 420 positioned on the safety vent 412 is fractured, thereby interrupting the current. That is, a wiring pattern formed on the current interrupting device 420 is cut so that the current cannot flow any longer. Of course, if the current is interrupted, the overcharge is stopped, thereby preventing explosion and combustion of the battery.

Further referring to FIG. 1, the center pin 260 is typically inserted through the center of the electrode assembly 200. Therefore, if an external impact is induced due to falling or the like, the center pin 260 may come out toward the top of the electrode assembly 200, i.e., toward the safety vent 412, and strike the bottom side of the safety vent 412. Upon being struck by the center pin 260, the safety vent 412 may be deformed or fractured so that the safety device cannot operate, even if the battery is overcharged. However, according to the present invention, the positive electrode tab 214, which serves as a center pin, is integrally formed with the positive electrode plate 210 as shown in FIG. 5. Therefore, even if an external impact is induced due to falling or the like, the positive electrode tab 214 cannot come out of the center of the electrode assembly 200 to the outside.

In addition, because the positive electrode tab 214 is formed in an extended width, the surface area of the positive electrode tab 214 is increased. As a result, the heat produced inside the battery can be transferred to the positive electrode tab 214 through the welding area between the positive electrode tab 214 and the positive uncoated region 212, thereby releasing the heat. In other words, the positive electrode tab 214 may also serve as a heat sink.

As described above, in the inventive cylindrical lithium ion secondary battery, as the width of an electrode tab is extended so that the electrode tab also serves as a center pin, it is not necessary to separately insert a center pin, and thus manufacturing cost and steps can be reduced. Furthermore, because an electrode tab is welded to an uncoated region of the electrode plate, the electrode tab may also serve as a heat sink. As a result, the electrode tab can release the heat produced within the battery, and basically solves the problem of the separately inserted center pin striking the safety vent.

Although a preferred embodiment of the present invention has been described for illustrative purposes, those skilled in the art will appreciate that various modifications, additions and substitutions are possible without departing from the scope and spirit of the invention, as set forth in the accompanying claims.

What is claimed is:

1. A cylindrical lithium ion secondary battery, comprising:
   a wound electrode assembly that includes a positive electrode plate having a positive current collector, a positive active material arranged to form a coated portion of the positive current collector and a positive electrode tab welded to an uncoated portion of the positive current collector, a negative electrode plate having a negative current collector, a negative active material arranged to form a coated portion of the negative current collector, and a negative electrode tab welded to an uncoated portion of the negative current collector, and a separator interposed between the positive electrode plate and the negative electrode plate;
   a case for receiving the electrode assembly; and
   a cap assembly for sealing a top opening of the case;
   wherein at least one of the positive electrode tab and the negative electrode tab includes:
   a projection portion extending above a remainder of the wound electrode assembly, and a center pin portion arranged on one of the positive electrode plate and the negative electrode plate and having a width greater than that of the projection portion.

2. The cylindrical lithium ion secondary battery of claim 1, wherein said at least one of the positive electrode tab and the negative electrode tab has the center pin portion extending toward a winding core of the electrode assembly.

3. The cylindrical lithium ion secondary battery of claim 2, wherein said center pin portion occupies an axial portion of said wound electrode assembly.

4. The cylindrical lithium ion secondary battery of claim 3, wherein the center pin portion extends through a center of the wound electrode assembly.

5. A cylindrical lithium ion secondary battery, comprising:
an electrode assembly including a positive electrode plate having a positive electrode tab, a positive active material region, a positive uncoated region formed adjacent to the positive active material region, a positive current collector exposed through the positive uncoated region, a negative electrode plate having a negative electrode tab, a negative active material region, a negative uncoated region formed adjacent to the negative active material region, a negative current collector exposed through the negative uncoated region, and a separator interposed between the positive electrode plate and the negative electrode plate;
a case for receiving the electrode assembly; and
a cap assembly for sealing a top opening of the case;
wherein at least one of the positive electrode tab and the negative electrode tab includes a center pin portion wound in a circular arc form in cross-section, and a length of the circular arc being not less than 70% of a circumference of an entire circle including the circular arc.

6. The cylindrical lithium ion secondary battery of claim 3, wherein the center pin portion is welded to a corresponding current collector over its entire area.

7. The cylindrical lithium ion secondary battery of claim 6, wherein a welded area of the center pin portion corresponds to the uncoated portion of the corresponding current collector.

8. The cylindrical lithium ion secondary battery of claim 3, wherein the center pin portion comprises a first area defined by vertical extension lines of opposite sides of the projection portion, and a second area which is a remaining area exclusive of the first area of the center pin portion.

9. The cylindrical lithium ion secondary battery of claim 1, wherein said at least one of the positive electrode tab and the negative electrode tab has the center pin portion extending away from a winding core of the electrode assembly.

10. The cylindrical lithium ion secondary battery of claim 9, wherein said center pin portion is perforated by a plurality of holes.

11. The cylindrical lithium ion secondary battery of claim 1, wherein a height of the center pin portion is equal to a height of the electrode assembly.

12. The cylindrical lithium ion secondary battery of claim 1, wherein the center pin portion is wound in a circular arc form in cross-section, and a length of the circular arc is not less than 70% of a circumference of an entire circle including the circular arc.

13. The cylindrical lithium ion secondary battery of claim 8, wherein a welded area of the center pin portion corresponds to both the first and second areas of the center pin portion.

14. The cylindrical lithium ion secondary battery of claim 8, wherein a welded area of the center pin portion corresponds to only the first area of the center pin portion.

15. A cylindrical lithium ion secondary battery, comprising:
an electrode assembly including a positive electrode plate having a positive electrode tab, a positive active material region, a positive uncoated region formed adjacent to the positive active material region, a positive current collector exposed through the positive uncoated region, a negative electrode plate having a negative electrode tab, a negative active material region, a negative uncoated region formed adjacent to the negative active material region, a negative current collector exposed through the negative uncoated region, and a separator interposed between the positive electrode plate and the negative electrode plate;
a case for receiving the electrode assembly; and
a cap assembly for sealing a top opening of the case;
wherein at least one of the positive electrode tab and the negative electrode tab is formed so as to have an extended width at a center of the electrode assembly, wherein said at least one of the positive electrode tab and the negative electrode tab has a projection portion which is higher than another portion of said at least one of the positive electrode tab and the negative electrode tab and which is exposed above the electrode assembly, and a center pin portion which is connected to the projection portion and which has a width extending toward the winding core of the electrode assembly, wherein the center pin portion comprises a first area defined by vertical extension lines of opposite sides of the projection portion, and a second area which is a remaining area exclusive of the first area of the center pin portion.

16. The cylindrical lithium ion secondary battery of claim 15, wherein the center pin portion is welded to the corresponding electrode plate only at the first area.

17. The cylindrical lithium ion secondary battery of claim 16, wherein the center pin portion has a plurality of holes formed in the second area.

18. The cylindrical lithium ion secondary battery of claim 17, wherein the holes are formed in any shape selected from a group consisting of circular, triangular and rectangular shapes.

19. The cylindrical lithium ion secondary battery of claim 15, wherein the corresponding electrode plate has an uncoated region formed at an area where the corresponding electrode plate contacts the first area, and an electrode active material region formed at an area where the corresponding electrode plate contacts the second area.

20. The cylindrical lithium ion secondary battery of claim 10, wherein each of the plurality of holes has a shape selected from a group consisting of a circle, a triangle and a square.

* * * * *